US008983766B2

(12) United States Patent
Morley

(10) Patent No.: US 8,983,766 B2
(45) Date of Patent: Mar. 17, 2015

(54) METHOD OF DETERMINING MODE OF TRANSPORTATION IN A PERSONAL NAVIGATION DEVICE

(75) Inventor: Simon Dean Morley, Auckland (NZ)

(73) Assignee: Mitac International Corp., Kuei-Shan Hsiang, Tao-Yuan Hsien (TW)

( * ) Notice: Subject to any disclaimer, the term of this patent is extended or adjusted under 35 U.S.C. 154(b) by 1221 days.

(21) Appl. No.: 12/610,339

(22) Filed: Nov. 1, 2009

(65) Prior Publication Data

US 2011/0106423 A1 May 5, 2011

(51) Int. Cl.
G01C 21/00 (2006.01)
G01C 21/32 (2006.01)
G01C 21/34 (2006.01)

(52) U.S. Cl.
CPC .................................. *G01C 21/3423* (2013.01)
USPC ............ 701/400; 701/408; 701/468; 701/526

(58) Field of Classification Search
USPC .......... 701/400, 408, 411, 423, 425, 433, 450
See application file for complete search history.

(56) References Cited

U.S. PATENT DOCUMENTS

| | | | | | |
|---|---|---|---|---|---|
| 5,652,570 | A | * | 7/1997 | Lepkofker | 340/573.4 |
| 6,591,263 | B1 | * | 7/2003 | Becker et al. | 1/1 |
| 6,650,902 | B1 | * | 11/2003 | Richton | 455/456.3 |
| 7,080,022 | B2 | * | 7/2006 | McCulloch | 705/5 |
| 7,761,229 | B2 | * | 7/2010 | Onishi et al. | 705/5 |
| 7,822,546 | B2 | * | 10/2010 | Lee | 701/412 |
| 7,908,080 | B2 | * | 3/2011 | Rowley et al. | 701/423 |
| 8,015,144 | B2 | * | 9/2011 | Zheng et al. | 706/52 |
| 8,170,790 | B2 | * | 5/2012 | Lee et al. | 701/400 |
| 8,229,458 | B2 | * | 7/2012 | Busch | 455/456.1 |
| 8,249,807 | B1 | * | 8/2012 | Barbeau et al. | 701/490 |
| 8,260,553 | B2 | * | 9/2012 | Klein et al. | 701/519 |
| 8,538,686 | B2 | * | 9/2013 | Gruen et al. | 701/426 |
| 8,725,612 | B2 | * | 5/2014 | Mundinger et al. | 705/35 |
| 2002/0069015 | A1 | * | 6/2002 | Fox et al. | 701/209 |
| 2004/0044466 | A1 | * | 3/2004 | Nesbitt | 701/202 |
| 2005/0015316 | A1 | * | 1/2005 | Salluzzo | 705/30 |
| 2008/0167813 | A1 | * | 7/2008 | Geelen et al. | 701/213 |
| 2008/0248815 | A1 | * | 10/2008 | Busch | 455/456.5 |
| 2009/0005972 | A1 | * | 1/2009 | de Koning | 701/208 |
| 2009/0197619 | A1 | * | 8/2009 | Colligan et al. | 455/456.3 |
| 2010/0082247 | A1 | * | 4/2010 | Klein et al. | 701/209 |
| 2010/0179756 | A1 | * | 7/2010 | Higgins et al. | 701/210 |
| 2010/0188432 | A1 | * | 7/2010 | Tsai et al. | 345/684 |
| 2010/0268450 | A1 | * | 10/2010 | Evanitsky | 701/201 |

FOREIGN PATENT DOCUMENTS

TW 200804857 1/2008
TW 200921052 5/2009

* cited by examiner

*Primary Examiner* — Nicholas Kiswanto
(74) *Attorney, Agent, or Firm* — Winston Hsu; Scott Margo

(57) ABSTRACT

To provide useful information to a user of a personal navigation device (PND) related to their current mode of transportation the PND receives a plurality of satellite navigation signals, utilizes the plurality of satellite navigation signals to determine position of the PND, determines a plurality of data based on the plurality of satellite navigation signals, utilizing the plurality of data as inputs to a statistical model to determine the mode of transportation, determines the information corresponding to the mode of transportation, and displays the information corresponding to the mode of transportation.

16 Claims, 3 Drawing Sheets

METHOD OF DETERMINING MODE OF TRANSPORTATION IN A PERSONAL NAVIGATION DEVICE

BACKGROUND OF THE INVENTION

1. Field of the Invention

The present invention relates to personal navigation devices (PNDs), and more particularly, to a method of determining a mode of transportation in a PND.

2. Description of the Prior Art

A number of navigation methods have been employed over the centuries by sailors desiring to go from one place to another without getting lost on the way or passing through dangerous waters. Whereas in the past, navigation was typically of interest to navigators on marine vessels, as more advanced navigation systems are developed, drivers, hikers, and tourists are rapidly adopting Global Navigation Satellite System (GNSS) technology to aid them in their travels.

One key to navigation is positioning, or the art of knowing precisely where one is at any given moment. In the past, positioning was accomplished through use of a sextant, which measures angular positions of celestial bodies relative to the horizon. Today, positioning may be accomplished with fair accuracy by GNSS receivers. Currently, only the NAVSTAR Global Positioning System (GPS) developed by the United States Department of Defense offers comprehensive positioning satellite coverage around the globe, though other systems should become operational by the year 2010.

A typical GPS receiver will include an antenna for receiving electrical signals transmitted by GPS satellites, and positioning circuitry for determining a position of the GPS receiver from the electrical signals, and generating corresponding position data. The antenna may be integrated into the GPS receiver, or may be connected externally through a wire. A GPS device, one type of personal navigation device (PND), may integrate the GPS receiver and further means for providing functions that use the position data generated by the GPS receiver. Typically, the GPS device may be a standalone mobile device, or may be integrated into an automobile as another instrument on the dashboard. The standalone mobile device may also be adapted for use in an automobile through a mount, which may be attached to the automobile through suction cups or other more permanent means.

The GPS device will typically include an internal map, which may be used in conjunction with the position data to determine where the GPS device is located on the map. Based on this information, a navigator function of the GPS device may calculate a route along known roads from the position of the GPS device to another known location. The route may then be displayed on a display of the GPS device, and instructions on upcoming maneuvers may be displayed on the GPS device and played through a speaker of the GPS device to alert the user as to which maneuvers should be taken to reach their destination. As the GPS device travels along the route, the GPS device is also able to determine speed based on how far the GPS device travels over a period of time.

The GPS device may also utilize the position data to perform queries on points of interest (POIs). Typically, the GPS device will include database query functions which may be utilized to locate POIs in local databases on the GPS device, in vendor databases, or in third party databases. Thus, for example, if the GPS device is located in Seattle, the GPS device may find POIs such as Pike Place Market and the Space Needle. If the GPS device connects to the third party database through a GPRS modem, such as a cell phone, the GPS device may find even more POIs, including businesses, hotels, and gas stations.

Given so much information accessible by the GPS device, or which the GPS device is able to calculate, many new algorithms may be developed that utilize the information in the GPS device to improve integration of the GPS device's current and future locations with map and POI databases, so as to deliver more relevant and useful information to the user about their current environment and their upcoming travel journey. However, many functionalities are as yet unexplored and unimplemented, one of which is automatic determination of mode of transportation based on the information in the GPS device.

SUMMARY OF THE INVENTION

According to an embodiment of the present invention, a method of utilizing a personal navigation device (PND) to display information corresponding to a mode of transportation comprises the PND receiving a plurality of satellite navigation signals, the PND utilizing the plurality of satellite navigation signals to determine position of the PND, the PND determining a plurality of data based on the plurality of satellite navigation signals, utilizing the plurality of data as inputs to a statistical model to determine the mode of transportation, the PND determining the information corresponding to the mode of transportation, and the PND displaying the information corresponding to the mode of transportation.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
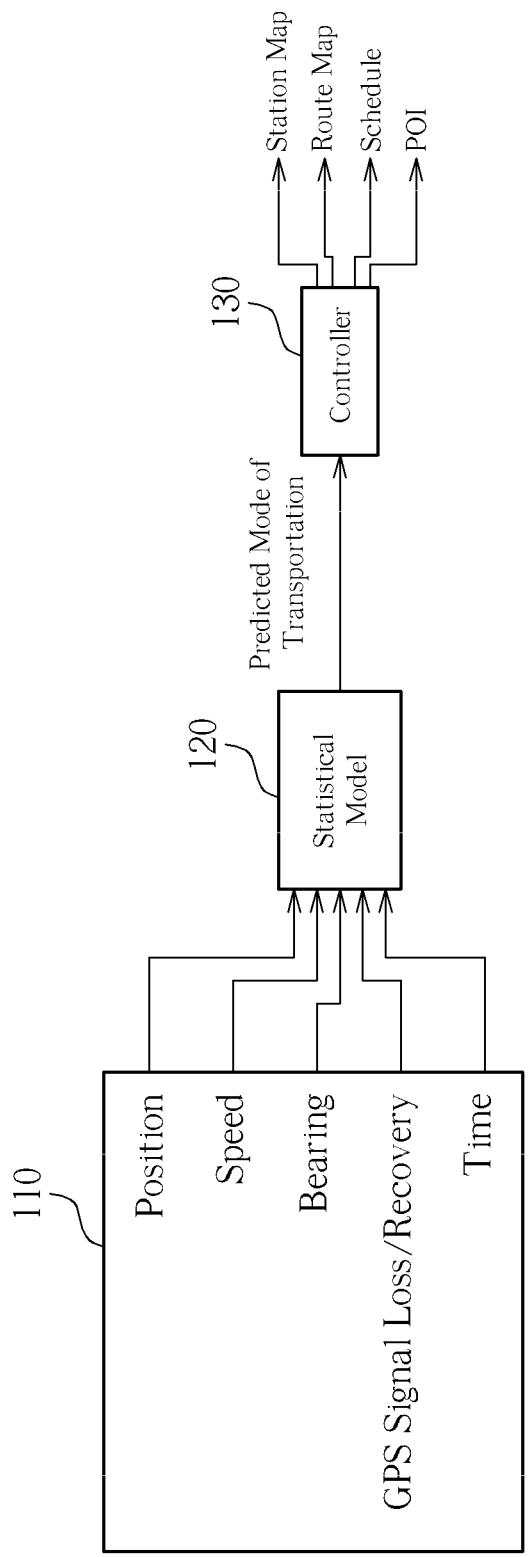
FIG. 1 is a diagram of displaying information corresponding to a mode of transportation according to an embodiment of the present invention.

Please refer to FIG. 1, which is a diagram of a method of determining a mode of transportation according to an embodiment of the present invention. A personal navigation device (PND) determines the mode of transportation. The method may be implemented in any navigation device that utilizes a Global Navigation Satellite System to determine its position. As shown in FIG. 1, the PND is able to sense or calculate a plurality of data 110, which may include, for example, position of the PND, speed of the PND, bearing of the PND, loss and recovery of satellite signals received by the PND, and the current time of day. The time of day may be determined from incoming GPS satellite signals, or simply from an internal clock of the PND. The position of the PND may be determined through trilateration of the incoming satellite signals, and may be used in coordination with mapping software to determine an address corresponding to the position, including street number, street, city, state/province, and zip code, as well as nearby points of interest (POIs), such as hospitals, restaurants, and mass transit stations. Signal data may be obtained by the PND by decoding the incoming satellite signals, and the PND may utilize the signal data to perform the trilateration, as well as to determine current time of day. Loss of the satellite signals received by the PND may also be determined as data of the plurality of data 110. For example, if the PND has entered a building, a tunnel, or some other structure that would have lossy or no reception, a receiver of the PND may detect signal loss during reception of the incoming satellite signals, and may generate a lossy signal indicator in response thereto. The signal loss may be reduced signal strength and/or signal integrity detected by the PND. The signal loss may also be detected if the signal data is corrupted. If the loss of the satellite signals received by the PND is followed by the recovery of the satellite signals received by the PND, the PND may determine that the PND has left the building, the tunnel, or the other structure with lossy or no reception. In one embodiment, if the lossy signal indicator is not asserted after a period of time in which the lossy signal indicator is asserted, the PND may determine that the satellite signals are recovered.

The speed and the bearing of the PND may be calculated from changes in the position of the PND. For the speed, the changes in the position of the PND may be used to calculate a distance, which may then be divided by change in time over the distance traveled. The bearing may be determined by calculating a line through a sequence of two or more positions determined by the PND. For example, the PND may determine that it is heading east if the positions of the sequence are consistently east of each other over time. If the PND has an internal compass, or is connected to an external compass, the PND may determine the bearing by taking a reading of the compass.

The mode of transportation determined by the PND may be a train, a ferry, an automobile, a bus, a subway, or a plane. The mode of transportation determined may be a current mode of transportation, a past mode of transportation, or a predicted future mode of transportation. For example, while the PND may not be able to determine that it is on the plane during flight, the PND may be able to determine that it may be on the plane in the near future based on some combination of the plurality of data 110 as applied to the statistical model 120. How the statistical model 120, or algorithm, may be used to determine the mode of transportation is described in a later section.

Once the PND has utilized the statistical model 120 to determine the mode of transportation, and outputted the mode of transportation to a controller 130 in the PND, the PND may then begin to display information related to the mode of transportation. The controller 130 may be utilized to control a display of the PND to output the information related to the mode of transportation. The PND may establish a passing route the user is traveling on according to the received satellite navigation signal. Then, the passing route may be compared with the map information to determine whether it meets any set route of the transportation mode, e.g. train or ferry, existing in the map information. The PND may assume the user is traveling by a particular transportation mode accordingly. As shown in FIG. 1, types of information that may be shown by the PND may include station maps, route maps, schedules, or POIs. For example, if the PND determines that it is, or will be, on the train, the PND may further determine from the bearing and the position which set route and schedule the PND is, or will be, on, and where along the set route the PND is located. Based on this information, the PND could then display a list of upcoming stations along the set route, and upon selection by the user, further display a map of the upcoming station selected by the user. If the user is planning on making a transfer, the PND may indicate schedule delays of other set routes in the upcoming station. If the upcoming station is a final destination of the user, then the PND may display nearby POIs, such as museums, restaurants, and hotels. The same could be applied to situations where the mode of transportation is the ferry, the bus, or the plane. The PND could display ferry terminal maps and schedules, bus routes and station information, or flight schedules and delays, airport maps, and local time, weather, and POIs at an intended destination.

Figure 2:
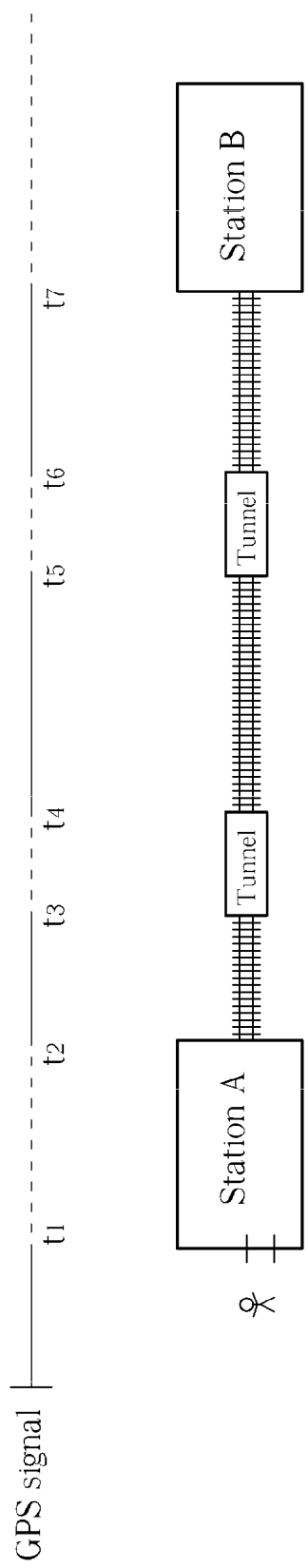
FIG. 2 is a diagram illustrating inputs for determining the mode of transportation as a train.

Please refer to FIG. 2, which is a diagram of a practical application of the present invention method to determining that the mode of transportation is the train. The data may be entered into the statistical model 120 as the PND travels from a street, enters a first train station (Station A), travels along a train line, passes through tunnels, and arrives at a second train station (Station B). For example, as the user approaches Station A, the PND may determine that Station A is a nearby POI. As the user enters Station A at t1, if the GPS signals are not lost, the PND may immediately link the position with Station A. Else, if the GPS signals are lost, the PND may determine the last known position and bearing, and determine that the user has a high probability of being located in Station A. Once the GPS signals are recovered at t2, the PND may determine if the user has left Station A near the railroad tracks. As the user travels along the railroad tracks from t2 to t3, the PND may detect entrance to the tunnel at t3, and exit from the tunnel at t4 based on the loss and recovery of the GPS signals. This may occur again from t5 to t6. The PND may also detect waypoints corresponding to the train line. Knowing the positions of the tunnels, the previous entry and exit at Station A, and the speed of the PND, the PND may predict that the mode of transportation is the train, and knowing the bearing and the time, the PND may further predict the train line and schedule that the PND is traveling on. Once the PND predicts the mode of transportation, the PND may display a request for acknowledgement of the mode of transportation. If the user acknowledges the mode of transportation, the PND may proceed to display the information mentioned above, e.g. a map of Station B. The PND may also display a list of all upcoming stations, and request that the user in a selection of a destination station selected from the list. Then, a map of the destination station may be displayed. If the PND receives a negative confirmation, then the PND may update the statistical model 120, or algorithm. The PND may also update the statistical model 120 through reinforcement if a confirmation is received.

Figure 3:
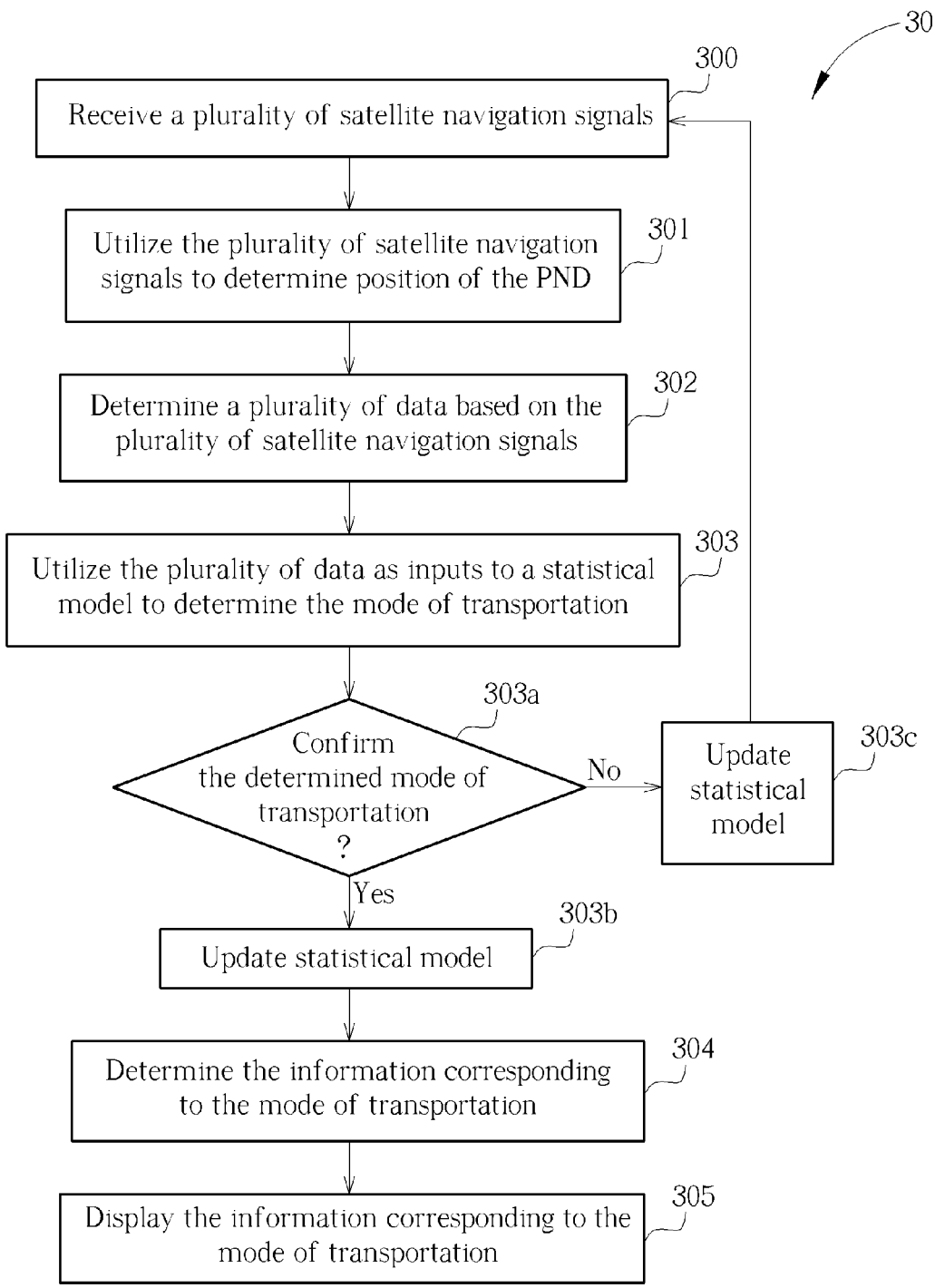
FIG. 3 is a flowchart of a method of utilizing a personal navigation device to display information corresponding to a mode of transportation according to an embodiment of the invention.

Please refer to FIG. 3, which is a flowchart of a process 30 that utilizes a personal navigation device (PND) to display information corresponding to a mode of transportation according to an embodiment of the invention. The process 30 may realized as software for controlling operation of the PND, and comprises the following steps:

Step 300: Receive a plurality of satellite navigation signals.

Step 301: Utilize the plurality of satellite navigation signals to determine position of the PND.

Step 302: Determine a plurality of data based on the plurality of satellite navigation signals.

Step 303: Utilize the plurality of data as inputs to a statistical model to determine the mode of transportation.

Step 303*a*: Determine if confirmation of the determined mode of transportation is received from the user. If confirmation is received, go to step 303*b*. Otherwise, if negative confirmation is received, meaning that the determined mode of transportation was incorrect, go to step 303*c*.

Step 303b: Update the statistical model 120 to note that the determined mode of transportation was correct. Go to step 304.

Step 303c: Update the statistical model 120 to note that the determined mode of transportation was incorrect. Go to step 300.

Step 304: Determine the information corresponding to the mode of transportation.

Step 305: Display the information corresponding to the mode of transportation, such as a schedule, a map of a current station, or a map of an upcoming station corresponding to the mode of transportation.

In summary, the method of the present invention allows the PND to determine the mode of transportation based on the plurality of data, and derivatives thereof, through comparison with the statistical model, and then display relevant information related to the mode of transportation in the PND. The relevant information may be obtained from internal or external databases. This allows the user of the PND to access useful information related to the mode of transportation and the user's intended destination automatically, without having to perform a search to find the information, or manually enter the set route they are currently traveling on, which also saves time.

Those skilled in the art will readily observe that numerous modifications and alterations of the device and method may be made while retaining the teachings of the invention.

What is claimed is:

1. A method of utilizing a personal navigation device (PND) to display information corresponding to a mode of transportation, the method comprising:
   the PND receiving a plurality of satellite navigation signals;
   the PND utilizing the plurality of satellite navigation signals to determine a position of the PND;
   the PND determining a plurality of data based on the plurality of satellite navigation signals, comprising the PND detecting a loss of reception of the plurality of satellite navigation signals;
   utilizing the plurality of data as inputs to a statistical model to determine the mode of transportation that the PND is currently traveling on, wherein the mode of transportation is a train, a bus, a subway, a ferry, or an airplane;
   the PND determining the information corresponding to the mode of transportation; and
   the PND displaying the information corresponding to the mode of transportation.

2. The method of claim 1, wherein the PND determining the plurality of data based on the plurality of satellite navigation signals comprises:
   the PND determining a bearing or a speed of the PND based on the plurality of satellite navigation signals.

3. The method of claim 1, wherein the PND determining the plurality of data based on the plurality of satellite navigation signals comprises:
   the PND detecting a recovery of reception of the plurality of satellite navigation signals.

4. The method of claim 1, further comprising:
   the PND generating a transit station flag when the PND determines that the position is within a threshold distance of a transit station, wherein the transit station flag is data of the plurality of data;
   wherein the PND determining the plurality of data based on the plurality of satellite navigation signals comprises:
   the PND detecting a loss of reception of the plurality of satellite navigation signals.

5. The method of claim 4, wherein utilizing the plurality of data as the inputs to the statistical model to determine the mode of transportation further comprises utilizing the transit station flag and the loss of satellite navigation signal reception as the inputs to the statistical model to determine the mode of transportation.

6. The method of claim 1, wherein the PND determining the plurality of data based on the plurality of satellite navigation signals comprises:
   the PND determining a current time of day.

7. The method of claim 1, wherein utilizing the plurality of data as the inputs to the statistical model to determine the mode of transportation further comprises:
   the PND comparing the inputs with a map comprising a waypoint corresponding to a predicted mode of transportation.

8. The method of claim 1, wherein utilizing the plurality of data as the inputs to the statistical model to determine the mode of transportation further comprises:
   the PND comparing the inputs with a schedule corresponding to a predicted mode of transportation.

9. The method of claim 1, further comprising:
   the PND displaying a request for confirmation regarding the mode of transportation.

10. The method of claim 9, further comprising:
    receiving a confirmation from the user regarding the mode of transportation; and
    the PND displaying a schedule corresponding to the mode of transportation when the mode of transportation is confirmed.

11. The method of claim 9, further comprising:
    receiving a confirmation from the user regarding the mode of transportation; and
    the PND updating the statistical model when the confirmation is received.

12. The method of claim 9, further comprising:
    receiving a negative confirmation from the user regarding the mode of transportation; and
    the PND updating the statistical model when the negative confirmation is received.

13. The method of claim 9, further comprising:
    receiving a confirmation from the user regarding the mode of transportation; and
    the PND displaying a map of a current station corresponding to the mode of transportation when the confirmation is received.

14. The method of claim 9, further comprising:
    receiving a confirmation from the user regarding the mode of transportation; and
    the PND displaying a map of an upcoming station corresponding to the mode of transportation when the confirmation is received.

15. The method of claim 1, wherein further comprising:
    the PND detecting a loss of reception of the plurality of satellite navigation signals, the plurality of satellite navigation signals being are GPRS signals.

16. The method of claim 1, further comprising:
    the PND detecting a recovery of reception of the plurality of satellite navigation signals, the plurality of satellite navigation signals being GPRS signals.

* * * * *